United States Patent
Drexl et al.

(10) Patent No.: US 6,575,283 B2
(45) Date of Patent: Jun. 10, 2003

(54) ACTUATION DEVICE FOR A FRICTION CLUTCH

(75) Inventors: Hans-Jürgen Drexl, Schonungen (DE); Thomas Otto, Würzburg (DE); Hans Fliege, Obertheres (DE); Jürgen Schmitt, Schonungen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/835,455

(22) Filed: Apr. 16, 2001

(65) Prior Publication Data

US 2001/0052444 A1 Dec. 20, 2001

(30) Foreign Application Priority Data

Apr. 14, 2000 (DE) .......................................... 100 18 649

(51) Int. Cl.$^7$ .............................................. F16D 25/08
(52) U.S. Cl. ................................ 192/85 CA; 192/91 A; 192/30 W; 192/113.4
(58) Field of Search .......................... 192/85 R, 85 CA, 192/91 A, 30 W, 98, 113.4; 477/174, 176, 180

(56) References Cited

U.S. PATENT DOCUMENTS

| | | | |
|---|---|---|---|
| 5,067,599 A | * | 11/1991 | Roder et al. ................. 477/176 |
| 5,427,215 A | * | 6/1995 | Jarvis ........................ 192/3.63 |
| 6,062,366 A | * | 5/2000 | Herzig et al. ........... 192/85 CA |
| 6,116,399 A | * | 9/2000 | Drexl et al. ............... 192/91 A |

FOREIGN PATENT DOCUMENTS

| | | | |
|---|---|---|---|
| DE | 197 16 600 A1 | 12/1997 | ........... B60K/23/02 |
| EP | 0 371 975 B1 | 4/1992 | ........... F16D/25/14 |

* cited by examiner

*Primary Examiner*—Richard M. Lorence
(74) *Attorney, Agent, or Firm*—Cohen, Pontani, Lieberman & Pavane

(57) ABSTRACT

In an actuation device for a friction clutch which is arranged in the drivetrain of a motor vehicle between a drive unit and a transmission, comprising a pressure medium force cylinder arrangement by means of which the friction clutch can be actuated via a release member, a measuring arrangement which detects an actual release, a control/regulating valve arrangement which is connected with a pressure medium source, with a pressure compensation opening or a pressure compensation reservoir and with the pressure medium force cylinder arrangement and which is controllable electrically, by means of which valve arrangement the pressure medium force cylinder arrangement can be actuated depending on the actual release and on a reference release which can be predetermined, the control/regulating valve arrangement can be actuated via control/regulating electronics depending on the actual release, on an electrically presettable command variable and on a characteristic line converting the command variable into the reference release, wherein several different characteristic lines are provided which can be selectively activated depending on a desired driving behavior and/or depending on driving states and/or operating states of the vehicle for actuating the valve arrangement.

17 Claims, 6 Drawing Sheets

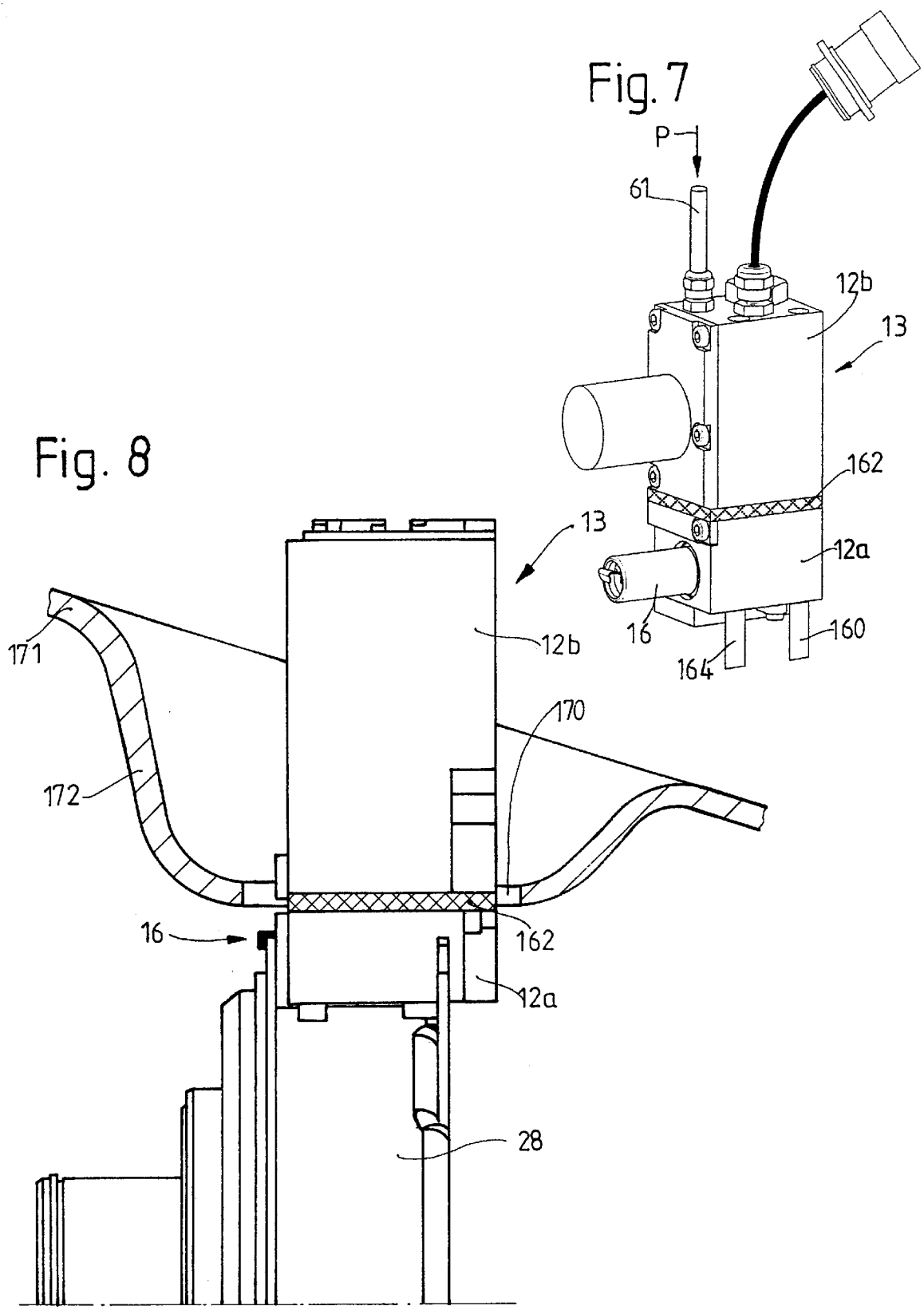

ACTUATION DEVICE FOR A FRICTION CLUTCH

BACKGROUND OF THE INVENTION

1. Field of the Invention

The present invention is directed to an actuation device for a friction clutch which is arranged in the drivetrain of a motor vehicle between a drive unit and a transmission, comprising a pressure medium force cylinder arrangement by means of which the friction clutch can be actuated via a release member, a measuring arrangement which detects an actual disengagement or release, a control/regulating valve arrangement which is connected with a pressure medium source, with a pressure compensation opening or a pressure compensation reservoir and with the pressure medium force cylinder arrangement and which is controllable electrically, by means of which control/regulating valve arrangement the pressure medium force cylinder arrangement can be actuated depending on the actual release and on a reference release which can be predetermined.

2. Description of the Related Art

An actuation device of the type mentioned above with an electrically controllable control/regulating valve arrangement is known, for example, from EP 0 371 975 B1. Other actuation devices of this type are known from DE 197 16 600 A1 whose disclosure is incorporated in the disclosure of the present application by reference.

It is known, per se, from DE 197 16 600 A1 to provide a characteristic line which correlates a reference release to a command variable so that, proceeding from a disengaged state, a fast closing of the clutch up to the slip point is achieved on one hand and a spread between the slip point and the engaged position is achieved on the other hand with a view to a sensitive engagement.

SUMMARY OF THE INVENTION

In contrast, according to a first aspect of the invention in an actuation device of the type mentioned above with an electrically controllable control/regulating valve arrangement, the control/regulating valve arrangement can be actuated depending on the actual release, on a command variable which can be predetermined electrically, and on a characteristic line which converts the command variable into the reference release. Several different characteristic lines are provided which can be selectively activated depending on a desired driving behavior and/or depending on driving states and/or operating states of the vehicle for actuating the valve arrangement.

It is suggested according to the invention that the characteristic lines are switched over in a certain way in order to provide specific characteristic line shapes for different operating states or driving states. The switching over of characteristic lines makes it possible to optimize the operating behavior of the actuation device with respect to different objectives. On the one hand, startup comfort can be increased and, on the other hand, clutch wear can be minimized in order to prolong the life of the clutch, for instance. The characteristic lines may be customer-specific characteristic lines, that is, for example, characteristic lines provided by an automobile manufacturer in an actuation device specific to a clutch manufacturer or the like, for example, by outfitting the control/regulating electronics with an EPROM containing the characteristics in digital form.

For example, a startup and/or maneuvering characteristic line with a spread slip point associated with a startup and/or maneuvering situation can be provided in order to facilitate startup and/or maneuvering. Another possibility would be to provide an upshift and/or downshift characteristic line without a spread slip point associated with an upshift and/or downshift situation in order to minimize slip states of the friction clutch with respect to time and accordingly to counteract clutch wear.

It is possible for at least one of the characteristic lines to be activated manually by means of a selector switch, for example, in order to enable the driver to choose between a more comfortable clutch actuation response or a clutch actuation response better suited to recreational driving. Further, it is particularly preferable to provide means for detecting the driving status and/or means for detecting the operating state which switch between several characteristic lines in order to activate an associated characteristic line depending on the detected driving state and/or operating state.

A friction clutch to be actuated by means of the actuation device mentioned in the beginning is generally arranged in a housing, often called a bell housing or a housing cover, between the transmission and the drive unit and can be formed at least partially by wall portions of the drive unit housing and/or of the transmission housing. In this case, it is advisable to arrange the pressure medium force cylinder arrangement in the housing cover as well; it has proven advantageous when the pressure medium force cylinder arrangement comprises a ring cylinder which encloses, preferably concentrically, a torque transmission shaft, especially a transmission input shaft. In this case, it is advisable in many respects to arrange a constructional unit at the pressure medium force ring cylinder and to connect a ring cylinder space of the pressure medium force ring cylinder to the control/regulating valve arrangement via at least one connection of the constructional unit. However, this is problematic in that the pressure medium force ring cylinder is exposed in the housing cover to comparatively high thermal loading which may not necessarily be withstood by the sensitive components of the actuation device.

In order that the thermal loading can at least be reduced with respect to the constructional unit and heat-sensitive components or a heat-sensitive region of the constructional unit, it is suggested according to a second aspect of the invention that the constructional unit has a thermal dividing or separating layer which is arranged between a heat-sensitive region of the constructional unit and a fastening region by means of which the constructional unit is arranged at the pressure medium force ring cylinder. Components and parts which need not be arranged in immediate contact with the pressure medium force ring cylinder can accordingly be arranged so as to be thermally isolated from the pressure medium force ring cylinder.

For example, the control/regulating valve arrangement can be integrated in the constructional unit. The separating layer could then be arranged between the control/regulating valve arrangement and the fastening region.

Further, the measuring arrangement can be integrated in the constructional unit. The measuring arrangement may possibly be arranged in a region of the constructional unit located between the fastening region and the separating layer to the extent that, following the measurement principle on which the measuring arrangement is based and the manner in which the measuring arrangement is coupled to an element whose position, for example, represents the actual release, the measuring arrangement must be arranged in the immediate vicinity of the pressure medium force cylinder arrangement. Also, the control/regulation valve arrangement and the measuring arrangement can be embodied in a common constructional unit structure.

In order to substantially reduce the thermal loading for the heat-sensitive region of the constructional unit (for example, the control/regulating valve arrangement) or to eliminate any thermal loading, the heat-sensitive region of the constructional unit (which can include the control/regulating valve arrangement) can project out of the latter through a housing cover opening. In this connection, it is particularly advisable when the wall of the housing cover has a recessed wall part in which the housing cover opening is provided, the housing cover opening being disposed at an inner end portion of a surrounding wall portion of the recessed wall part.

In this way, it can be achieved that at least the heat-sensitive area of the constructional unit is shielded relatively well against the thermal loading inside the housing cover and heat occurring in the hear-sensitive area of the constructional unit or heat which is transferred to the constructional unit through heat transfer can be discharged to the outside comparatively effectively. In this case, the thermal separating layer of the constructional unit can even be dispensed with under certain circumstances. According to a third aspect, the invention provides a corresponding actuation device. Preferably, however, a thermal separating layer is provided, which can be particularly effective when it is arranged roughly at the height of the wall portion defining the housing cover opening.

According to a fourth aspect, it is suggested in connection with the constructional unit arranged at the pressure medium force ring cylinder that a separate valve constructional unit having the control/regulating valve arrangement is arranged outside the housing cover, possibly at an outer side of the housing cover, wherein the valve constructional unit is connected with the constructional unit arranged at the pressure medium force ring cylinder via at least one connection hose or connection pipe and/or at least one electric connection cable.

According to this inventive suggestion, heat-sensitive components, especially the control/regulating valve arrangement, can be arranged outside the housing cover in order to reduce thermal loading thereon. Nevertheless, as with the actuation devices according to the first, second and third aspects, it is possible to integrate components serving to control the pressure medium force cylinder arrangement, especially the control/regulating valve arrangement and the measuring arrangement enabling exact positioning, in one or more constructional units resulting in a simple, economical and manageable construction and enabling a simple, economical assembly. When a constructional unit and a separate valve constructional unit (in which other components can also be integrated) are provided, the expenditure on assembly is only slightly higher compared with integration of the control/regulating valve arrangement in the constructional unit arranged at the pressure medium force ring cylinder, this slight increase being more than offset by the advantages achieved with respect to the reduced or even eliminated thermal loading of the control/regulating valve arrangement. Beyond this, the valve constructional unit is substantially more accessible because of its arrangement outside the housing cover, so that maintenance is substantially facilitated. As a rule, the measuring arrangement can be advantageously integrated in the constructional unit arranged at the pressure medium force ring cylinder.

It should be mentioned with regard to the actuation devices according to all of the aspects discussed above that the control/regulating valve arrangement can comprise a proportional solenoid valve which, as such, need be the only valve of the control/regulating valve arrangement. As a rule, the pressure medium force cylinder arrangement is a pneumatic force cylinder arrangement. In this case, the pressure medium force ring cylinder is a pneumatic force ring cylinder.

For an actuation device for a friction clutch which is arranged in the drivetrain of a motor vehicle between a drive unit and a transmission, comprising a pressure medium force cylinder arrangement by means of which the friction clutch can be actuated via a release member, a measuring arrangement which detects an actual release, a control/regulating valve arrangement which is connected with a pressure medium source, with a pressure compensation opening or a pressure compensation reservoir and with the pressure medium force cylinder arrangement and which is controllable electrically, by means of which control/regulating valve arrangement the pressure medium force cylinder arrangement can be actuated depending on the actual release and on a reference release which can be predetermined, it is suggested, according to another aspect, that the control/regulating valve arrangement comprises a valve operable in a mode which is associated with an engagement actuation as well as in a mode associated with a disengagement or release actuation and which has a first valve connection connected with the pressure medium force cylinder arrangement, a second valve connection connected with the pressure source, and a third valve connection which is connected with the pressure compensation opening and pressure compensation reservoir and which can be changed to a valve state connecting the first and second valve connections and to a valve state connecting the first and third valve connections.

Compared with the arrangement known from EP 0 371 975 B1, in which the control/regulating valve arrangement is formed by four switching valves, two of which are associated with an engagement actuation while the other two are associated with a release actuation, the quantity of structural component parts can be appreciably reduced according to the inventive suggestion with a consequent reduction in cost and simplification of the arrangement. The simplification of the arrangement results in advantages with respect to operating reliability.

The valve can be changed to a valve state in which the first valve connection is connected neither with the second valve connection nor with the third valve connection. The valve is preferably changed between valve states by means of electric control, wherein it can be provided that the valve occupies a determined valve state without electric control, preferably that valve state in which the first valve connection is connected neither with the second nor with the third valve connection.

A particularly preferred embodiment form is distinguished by the fact that the valve is a proportional solenoid valve. A large signal behavior which is substantially improved compared with the use of one or more switching valves is therefore achieved because a proportional valve can be opened very far, resulting in a large flow cross section for the pressure medium, particularly compressed air. With respect to small signal behavior, values are achieved which are as good as when one or more switching valve are provided.

It is not out of the question that the control/regulating valve arrangement comprises one or more additional valves apart from the valve mentioned above which is associated with the engagement actuation and release actuation.

However, with respect to the reduction in structural component parts and the simplicity of the arrangement, it is preferable that the control/regulating valve arrangement has only this one valve.

The valve arrangement and the measuring arrangement can be part of a unit arranged at a pressure medium force ring cylinder of the pressure medium force cylinder arrangement, wherein the unit preferably has a pressure medium connection which is detachably connected with the pressure medium source. Further, the unit can have a pressure medium connection which is detachably connected to the pressure compensation opening and pressure compensation reservoir or can have the pressure compensation opening itself. Further, the unit preferably comprises electric power supply connections and/or control connections comprising at least one electric plug-in connector. The plug-in connector may be constructed as a plug strip or the like arranged at a housing of the unit. However, a solution wherein the plug-in connector is arranged at a connection cable or connection cable tree which is guided out of the unit and has a plurality of connection lines is preferred.

Otherwise, it is possible to construct the actuation device such that it corresponds extensively to the actuation device known from EP 0 371 975 B1.

According to another aspect, however, it is suggested with respect to the actuation device mentioned above that a release piston of the pressure medium force cylinder arrangement which is arranged, along with the friction clutch, in a housing cover serves as a release member and acts directly on a release bearing associated with the friction clutch. By dispensing with a clutch release lever or the like which is provided in the actuation device of EP 0 371 975 B1, it is possible that the measuring arrangement can detect the actual release substantially more directly or can control or regulate the position of a pressure plate of the clutch substantially more directly. The inventive idea is based on the thought that any intermediate components or transmission members between the pressure medium force cylinder arrangement and release bearing are disadvantageous with respect to idle times, phase displacements, hysteresis effects and so on, and can lead to defects in the dynamic behavior of the actuation device and, at worst, to instability and vibrations.

The actuation device can advantageously be constructed in such a way that the control/regulating valve arrangement can be actuated via control/regulating electronics depending on the actual release and on a characteristic line converting an electrically presettable command variable into the reference release.

The invention is further directed to a set for providing at least one actuation device for a friction clutch arranged in the drivetrain of a motor vehicle between a drive unit and a transmission. The actuation device which can be provided based on the set comprises a pressure medium force cylinder arrangement by means of which the friction clutch can be actuated via a release member, a measuring arrangement which detects an actual release, a control/regulating valve arrangement which is connected with a pressure medium source, with a pressure compensation opening or a pressure compensation reservoir and with the pressure medium force cylinder arrangement, by means of which control/regulating valve arrangement the pressure medium force cylinder arrangement can be actuated depending on the actual release and on a reference release which can be predetermined. A constructional unit is arranged at a pressure medium force ring cylinder of the pressure medium force cylinder arrangement by means of a standard interface arrangement, wherein a ring cylinder space of the pressure medium force ring cylinder is connected to the control/regulating valve arrangement via at least one connection of the constructional unit. The actuation device can be, for example, an actuation device according to one of the aspects discussed in the preceding, including the further developments mentioned above.

With respect to increased effectiveness and productivity in the development and production of an actuation device of this type and/or with respect to economizing on storage costs, it is suggested according to another aspect of the invention that the set comprises at least the following components: at least one pressure medium force ring cylinder or a group of several different kinds of corresponding pressure medium force ring cylinders having a connecting and fastening area serving as a standard interface for fastening an associated constructional unit by means of a standard interface arrangement which comprises the connecting and fastening area as well as a connecting and fastening area of the constructional unit used as standard interface and/or a connecting and fastening adapter, at least one constructional unit or a group of several different types of constructional units having at least one connection which can be arranged, preferably in a detachable manner, at the pressure medium force ring cylinder by means of the standard interface arrangement, wherein a ring cylinder space of the pressure medium force ring cylinder can be connected to an associated control/regulating valve arrangement via a connection, and, if desired, at least one connecting and fastening adapter associated with a determined type of constructional unit of the group for arranging a constructional unit of this type at the pressure medium force ring cylinder by means of the standard interface arrangement, wherein the set comprises at least two pressure medium force cylinders of different types and/or at least two constructional units of different types.

According to the invention, a standard pressure medium force ring cylinder (release cylinder), for example, can be used for different types of drivetrains or different use situations by combining it with a constructional unit of the group which matches the type of drivetrain or use situation. For example, different automating devices for automating clutch actuation can be used, namely, with the same type of pressure medium force ring cylinder. This is particularly advantageous because the pressure medium force ring cylinder is a component which is to be optimized with respect to wear and which is complicated to test. A type of pressure medium force ring cylinder which is tested and meets requirements in a dependable manner can then be used for different drivetrains or different applications; adapting to the drivetrain or to the use situation and/or adapting for the sake of meeting automation requirements can then be carried out by selecting an appropriate type of constructional unit having at least one connection. By providing a fastening adapter, it is possible to combine a pressure medium force ring cylinder and a constructional unit having the at least one connection, whose standard interfaces themselves do not fit together.

Conversely, however, according to the inventive idea, a type of constructional unit can also be combined selectively with a pressure medium ring cylinder of a matching type from the group of different ring cylinders (which have different diameters or pressure medium volumes, for example).

The pressure medium force ring cylinder preferably has at least one fastening pin which can be made to engage with associated constructional units of the group and/or with at least one connecting and fastening adapter. Further, the pressure medium force ring cylinder can have at least one pressure medium inlet nipple and/or outlet nipple which can be made to engage with associated constructional units of the group and/or with at least one associated connecting and fastening adapter and by which the ring cylinder space of the pressure medium force ring cylinder can be connected to an associated control/regulating valve arrangement.

At least one of the constructional units can comprise a measuring arrangement which is integrated therein and which can preferably be brought into a measuring engagement with a ring piston of the pressure medium force ring cylinder in order to detect the actual release. Further, at least one of the constructional units can comprise a control/regulating valve arrangement which is integrated therein. It is particularly advisable when at least one of the constructional units comprises a control/regulating valve arrangement integrated therein and a measuring arrangement integrated therein, wherein the measuring arrangement can preferably be brought into a measuring engagement with a ring piston of the pressure medium force ring cylinder in order to detect the actual release.

Several constructional units can differ with respect to the type of measuring arrangement or the design of the measuring arrangement, for example, their coupling to the release member, and/or with respect to the type of control/regulating valve arrangement or the design of the control/regulating valve arrangement.

Further, several constructional units can differ from one another with respect to the construction of electric connections and/or pressure medium connections.

Several constructional units can differ with respect to their outer form or external configuration in order to enable matching with respect to the available installation space in a housing cover in which the friction clutch and pressure medium force ring cylinders are received.

At least one of the constructional units can have a thermal separating layer arranged between a heat-sensitive area of the constructional unit and its connecting and fastening area.

The set can have at least one separate valve constructional unit, in which a control/regulating valve arrangement is integrated and which is provided for arrangement outside a housing cover receiving the friction clutch and pressure medium force ring cylinder, possibly at the outer side of the housing cover, wherein at least one of the constructional units of the group is associated with the valve constructional unit and is connected or can be connected with it via at least one connection line, hose line or pipe line and/or at least one electric connection cable. The set can comprise a group of different types of corresponding valve constructional units.

The invention is further directed to an actuation device which can be provided by means of a set according to the invention.

The invention is further directed to a motor vehicle drivetrain comprising a drive unit, a transmission and a friction clutch arranged between the drive unit and the transmission, and comprising an actuation device as was described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 7 is a perspective view of a measuring and valve constructional unit (actuation unit) with a thermal separating layer;

FIG. 8 is an elevation view partly in section showing the measuring and valve constructional or actuation unit mounted at a pneumatic force ring cylinder, wherein the unit projects out of an opening of a housing cover.

DETAILED DESCRIPTION OF THE PRESENTLY PREFERRED EMBODIMENTS

Figure 1:
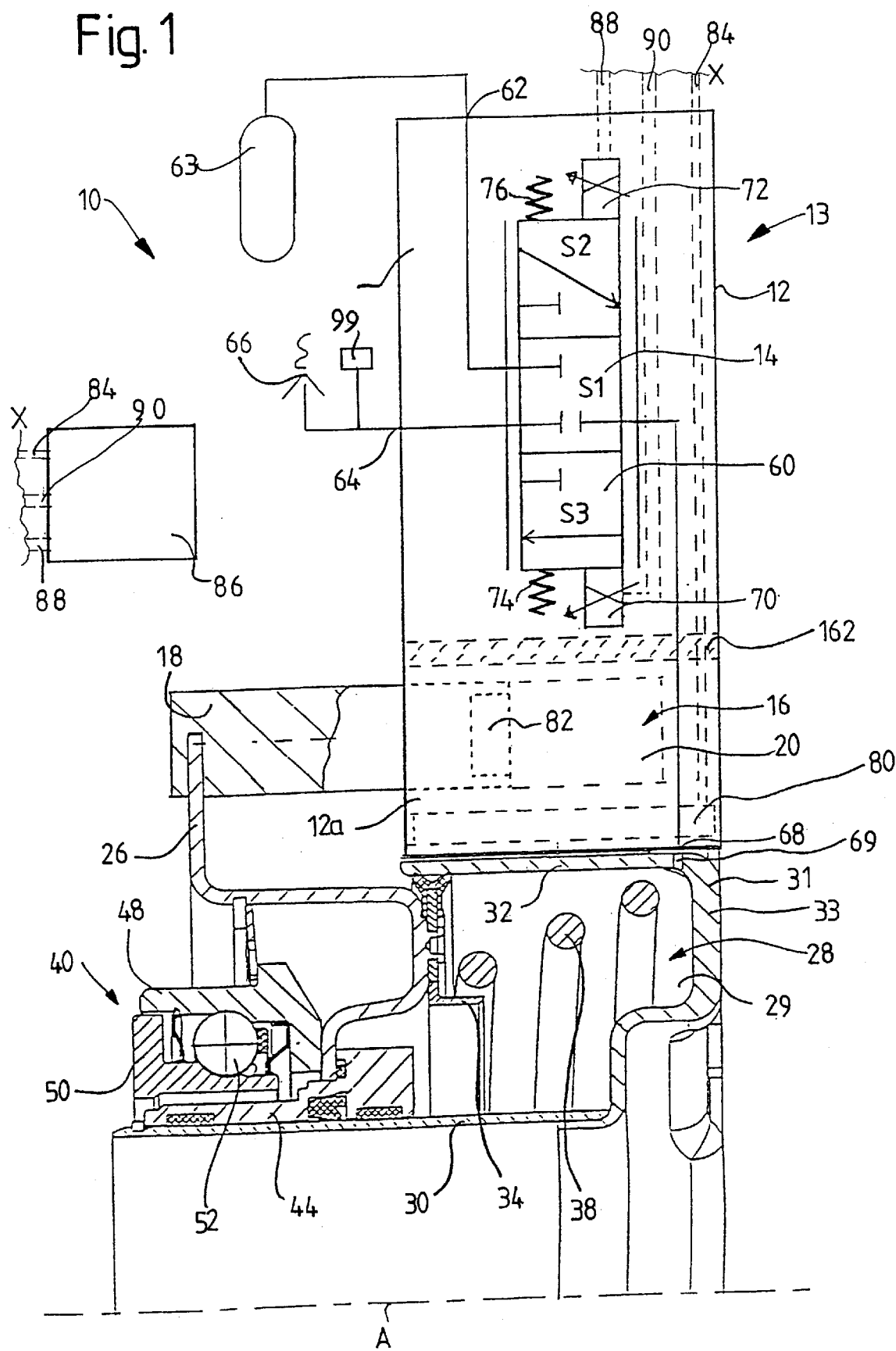
FIG. 1 shows a partly schematic partial longitudinal sectional view of an actuation device for a motor vehicle friction clutch with a pressure medium force cylinder, especially a pneumatic force cylinder, in the moved out state.

The basic construction and manner of operation of an actuation device 10 (which can also be referred to as a release arrangement) according to an embodiment example such as is used, for example, in commercial or utility vehicles will be described first with reference to FIG. 1. The actuation device 10 is constructed in such a way that it surrounds an axis of rotation A of a motor vehicle friction clutch, not shown, essentially concentrically and various components of the same are constructed in a ring-shaped manner and surround the axis of rotation A.

A housing 12 of the actuation device 10 in which a valve arrangement 14, described in the following, is integrated is shown on the radial outer side. Located on the radial inner side of the valve arrangement 14 is a measuring arrangement 16 which has a measuring member 18 that can be displaced in the direction of the axis of rotation A and which is arranged so as to be displaceable in a chamber 20 which is constructed in the housing 12 and open on one axial side.

At its end projecting from the chamber 20, the measuring member 18 is in a displacement engagement with an annularly constructed pressure medium force release piston 26 (which can also be called a release piston 26). The pressure medium force release piston 26 belongs to a pressure medium force cylinder arrangement 28 which may also be referred to as a release cylinder arrangement 28. In the present case, the pressure medium force cylinder arrangement is a pneumatic force cylinder arrangement. The release piston 26 which is constructed as a ring piston is displaceable in the direction of the axis of rotation A. A ring cylinder space 29 is defined by a pipe part 30 and an annular wall part 31 with a radial outer wall part 32 and a bottom portion 33 and a piston element 34 of the release piston 26 engaging in the ring cylinder space 29. Different sealing elements which seal the ring cylinder space 29 so as to be tight against pressure medium, particularly pneumatically tight, act between the release piston 26, particularly its piston element 34, and the pipe part 30 and the wall part 31. A pretensioning compression spring 38 is received in the ring cylinder space 29. This pretensioning compression spring 38 pretensions the release piston 26 in the direction of the stop of a release bearing 40 which is fixedly coupled to the release piston 26 and located at an associated diaphragm spring arrangement or plate spring arrangement, or the like, of the friction clutch. The release bearing 40 comprises two bearing shells 48, 50, known per se, between which bearing balls 52 are arranged. The bearing shell 48 is coupled with a displacing part 44 of the actuation release piston 26 and the bearing shell 50 is rotatable about the axis of rotation A with respect to these structural component parts and cooperates with spring tabs, or the like, of the diaphragm spring arrangement or plate spring arrangement for releasing the clutch.

It is noted that the actuation device 10 in the present embodiment form is designed to work together with a pushed clutch, but conversion would be possible for working with a pulled clutch without extensive constructional unit modifications.

The valve arrangement 14 is formed by a 3/3-way proportional solenoid valve 60 to which is connected a pneumatic source 63 via a connection 62 of the housing 12. Further, a pressure compensation opening 66 is connected to the valve 60 via a connection 64 of the housing 12. A pressure compensation reservoir or relief chamber 99 (shown schematically in FIG. 1) also could be used instead of opening 66. Finally, the valve 60 is connected to the ring cylinder space 29 of the release cylinder 28 via a connection 68 of the housing and a connection 69 of the actuation cylinder 28. The valve 60 can be displaced or adjusted via electrically controllable proportional magnets 70 and 72 from a holding position S1, which is occupied by the valve without excitation of the proportional magnets due to a corresponding spring pretensioning (springs 74, 76), into a compressed air feed position S2 in which a compressed air feed connection is produced between the pneumatic source 63 and the ring cylinder space 29 by the valve 60 and, alternatively, into a venting position S3 in which a venting connection is produced between the ring cylinder space 29 and the pressure compensation or outlet opening 66 for valve 60 or the reservoir 99. Alternatively, the valve can also be designed and connected in such a way that the valve occupies the venting position S3 without excitation of magnets 70 and 72 due to the pretensioning of the spring arrangement 74, 76. The corresponding design and connection of valve 60 is a matter of preference for the person skilled in the art and is not relevant to the discussion of the invention.

In the embodiment example shown, the measuring arrangement 16 works magnetically. The measuring arrangement 16 comprises a coil body 80 which works together with a magnet element 82 fixed to the inner end of the measuring member 18 and supplies an electric signal representing the axial position of the magnet element 82 to a control/regulating unit 86 via electric lines 84. Since the measuring member 18 is movement-coupled with the release piston 26 and is displaced synchronous to the latter in direction of axis A, the signal transmitted to the control/regulating unit 86 on the lines 84 represents the actual release of the release piston 26 and, accordingly, the actual release of the friction clutch. A sensor other than elements 80, 82 which serve as a magnetic sensor can also be provided, for example, a linear potentiometer.

Depending on a command variable indicating a reference release and depending on the actual release detected by means of the sensors 80, 82, the control/regulating unit 86 actuates the valve 60, specifically in such a way that the actual release approximates the reference release and, ideally, the actual release corresponds to the reference release. For this purpose, the control/regulating unit excites the proportional magnet 70 and/or proportional magnet 72, as needed, via electric lines 88, 90 in order to adjust selectively the holding position S1, the compressed air feed position S2 and the venting position S3. In the case of the compressed air feed position S2 and the venting position S3, the control/regulating unit 86 adjusts an effective flow cross section of the valve 60 by different degrees of excitation of the magnet 70 and magnet 72, respectively, in order to adjust the compressed air feed flow and compressed air venting flow which contribute to determining the releasing and engaging speed.

An electrical interface between the valve 60 and the control/regulating unit 86 is represented in FIG. 1 by a cross X. The interface can be formed by a plug connector arrangement, generally an electric connector, for example, a plug connector strip at the housing 12 or a plug connector at a free end of a multiwire cable or cable tree that is fixed with respect to the housing. Detachable electric connections of this kind are extremely advantageous particularly for maintenance and repair. In this regard, it is also extremely advisable that the connections 62 and 64 for the pneumatic source 63 and the pressure compensation opening 66 are constructed so as to be detachable and, for example, comprise connection nipples or the like which are fixed with respect to the housing.

The command variable on the basis of which the control/regulating unit 86 actuates the valve 60 and accordingly the release cylinder 28 and consequently the friction clutch can be predetermined by vehicle electronics or the like. However, it is also possible to derive the command variable from the actuation of a clutch pedal 100, an electric signal transmitter 102 (for example, a potentiometer) being associated with the latter (see FIG. 2).

Figure 2:
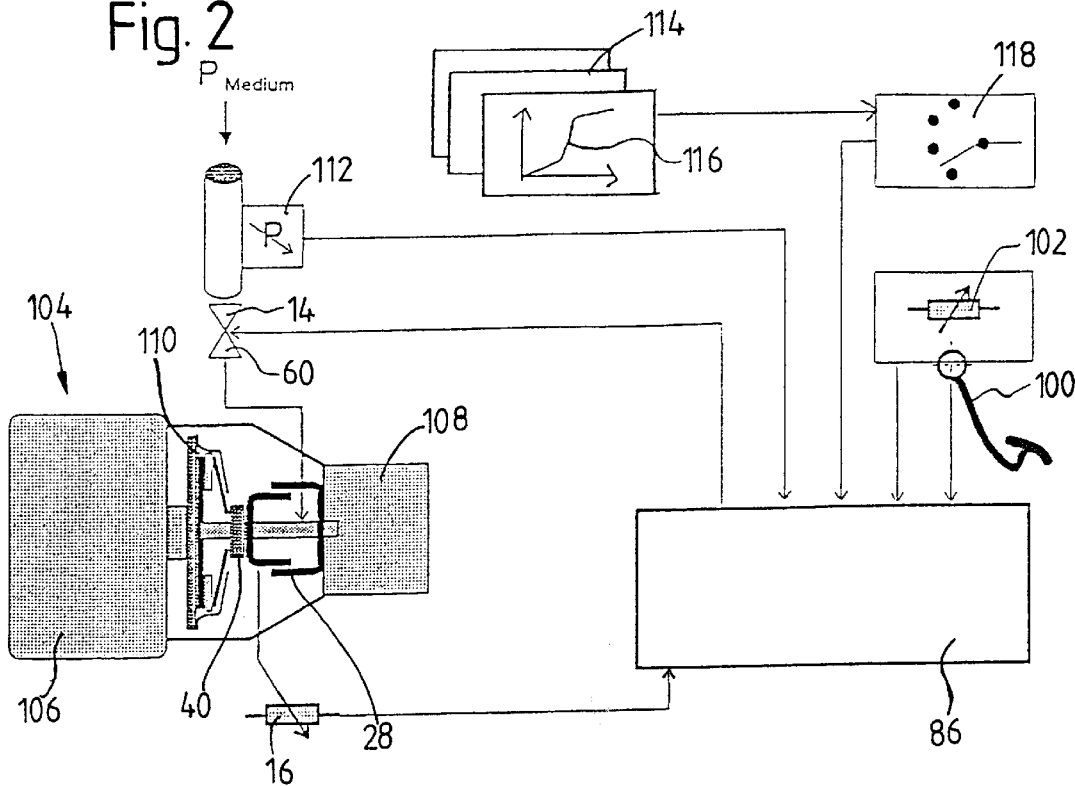
FIG. 2 is a schematic view showing a drivetrain of a motor vehicle with an engine, a transmission, a friction clutch and an actuation device for the friction clutch.

FIG. 2 is a schematic view showing a drivetrain 104 with an engine 106, a transmission 108 and a friction clutch 110 which can be actuated by means of a release cylinder 28 acting on a release bearing 40. A potentiometer 16 is indicated schematically in FIG. 2 as the sensor detecting the actual release. According to FIG. 2, the control/regulating unit also receives an electric signal from a pressure gauge 112 which measures the pressure of the compressed air delivered by the pneumatic source 63, not shown in FIG. 2.

A characteristic field 114 is assigned to the control/regulating unit 86, this characteristic field 114 having a plurality of characteristic lines 116 which convert the command variable given by the clutch pedal 100 into a reference release on the basis of which (and also on the basis of the actual release detected by the measuring arrangement 16), the control/regulating unit 86 controls the control/regulating valve 60. The characteristic field 114 can be stored inside or outside the control/regulating unit 86, for example, in one or more EPROMs.

A characteristic line switch 118 serves to select from the different characteristic lines 116 of the characteristic field a characteristic line upon which to base the conversion of the command variable to the reference release. The characteristic line switch 118 can have a selector switch which can be actuated by a driver of the vehicle. Alternatively or in addition, the switch 118 can comprise a characteristic line selecting unit which detects and evaluates the operating states of the actuation device and/or of the friction clutch and/or of the engine 106 and/or of the transmission 108 and/or vehicle states in general, and selects (activate) one of the characteristic lines depending on the latter. For example, the characteristic line activated for startup and maneuvering situations can differ from the characteristic line activated for normal driving situations.

Figure 3:
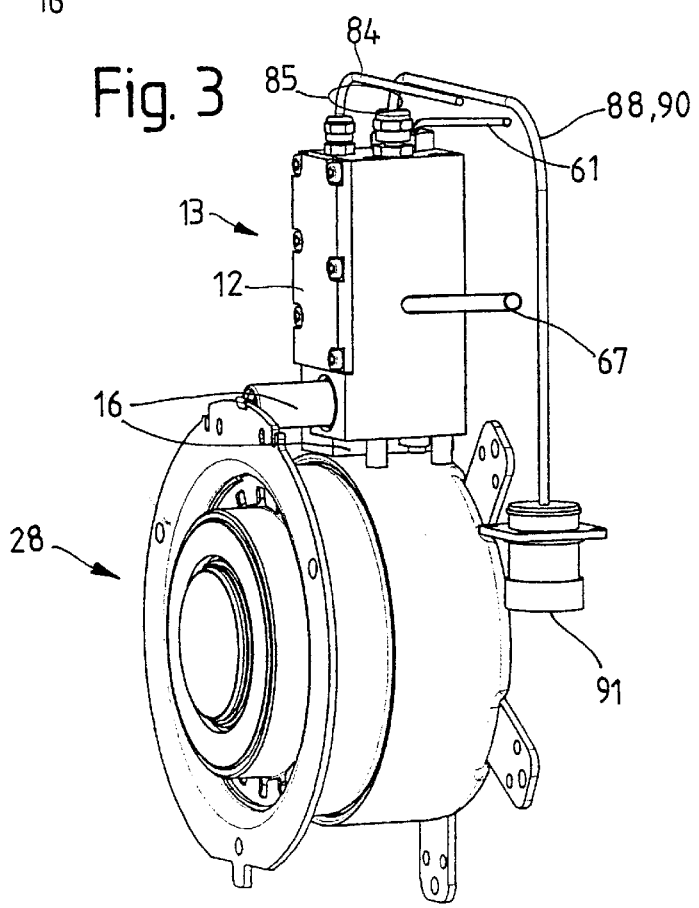
FIG. 3 is a perspective view of an actuation device for a motor vehicle friction clutch, for example, corresponding to FIG. 1.

A perspective view of a release or actuation cylinder 28 with actuation unit 13 mounted thereon, comprising a housing 12, a control/regulating valve arrangement integrated therein and a measuring arrangement 16 which can also be referred to as a path measuring device is shown in perspective in FIG. 3. The drawing shows power and control lines 85 by which the path measuring device and the control/regulating valve arrangement are connected to an associated control/regulating unit, specifically by means of electric plug-in connectors 91. Reference number 67 designates an optional ventilation, for example, corresponding to the pressure compensation opening 66. Reference number 61 designates a pressure medium supply line, especially a compressed air supply line.

It is noted that identical reference numbers are used in the description of the various embodiment examples for identical, corresponding or analogous structural component parts and functional elements for all embodiment examples and construction variants. Only the differences between the embodiment examples are discussed; in other respects, reference is made expressly to the description of the other embodiment examples.

Figure 4:
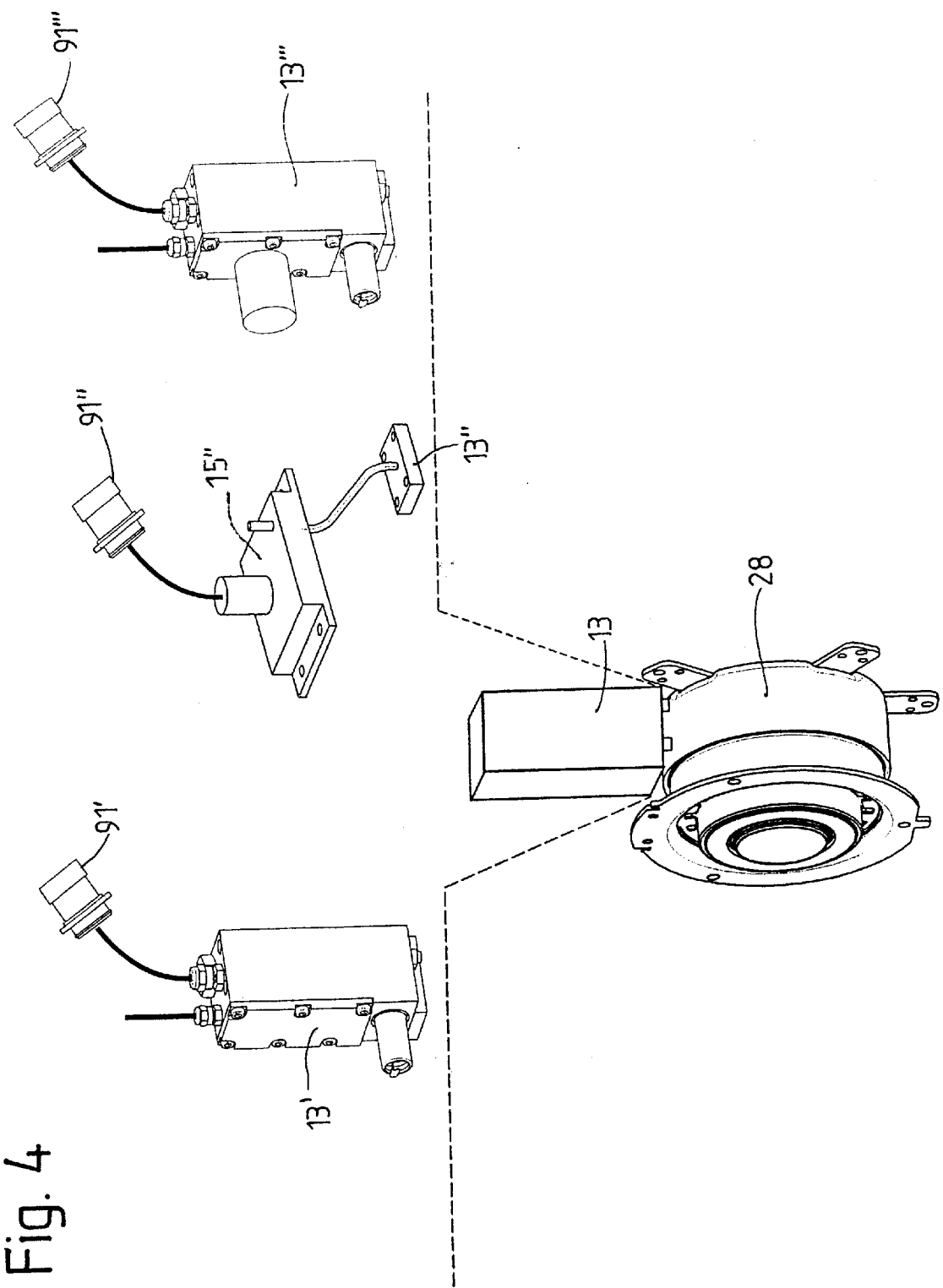
FIG. 4 is a perspective showing of a pneumatic force ring cylinder with which any one of the several depicted measuring and valve constructional units or actuation units can be used.

The release cylinder 28 preferably has a standard interface at which the different actuation units 13, especially different measuring and/or valve constructional units, can be mounted, as is indicated in FIG. 4. Accordingly, a constructional unit 13' or a constructional unit 13" or a constructional unit 13''' can be mounted at the release cylinder 28 instead of the constructional unit 13 which is shown only schematically in FIG. 4. The constructional units 13, 13' and 13''' are constructional units which contain a measuring arrangement and a control/regulating valve arrangement and which can differ from one another, for example, with respect to the measurement principle on which the measuring arrangement is based and/or with respect to the construction of the control/regulating valve arrangement. The valve arrangement can accordingly contain, for example, a plurality of switching valves or, alternatively, at least one proportional valve. With respect to the construction of the valves, motor-driven valves can also be provided in addition to solenoid valves.

The constructional unit 13" serves only to produce a pressure medium connection between a separate valve constructional unit 15" and the release cylinder 28. The valve constructional unit 15" can be arranged outside a housing cover receiving the friction clutch and release cylinder 28, for example, at the outer side of the cover. The unit 13" which can be mounted at the release cylinder 28 is connected with the valve constructional unit 15" via a pressure medium line. A measuring arrangement for detecting the actual release could be integrated in the constructional unit 13".

Figure 6:
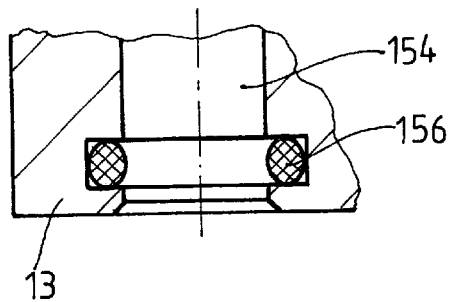
FIG. 6 is a fragmentary view depicting a mating piece, associated with an air inlet and outlet nipple of the pneumatic force ring cylinder of FIG. 5, of a constructional unit which can be mounted at a standard interface.
Figure 5:
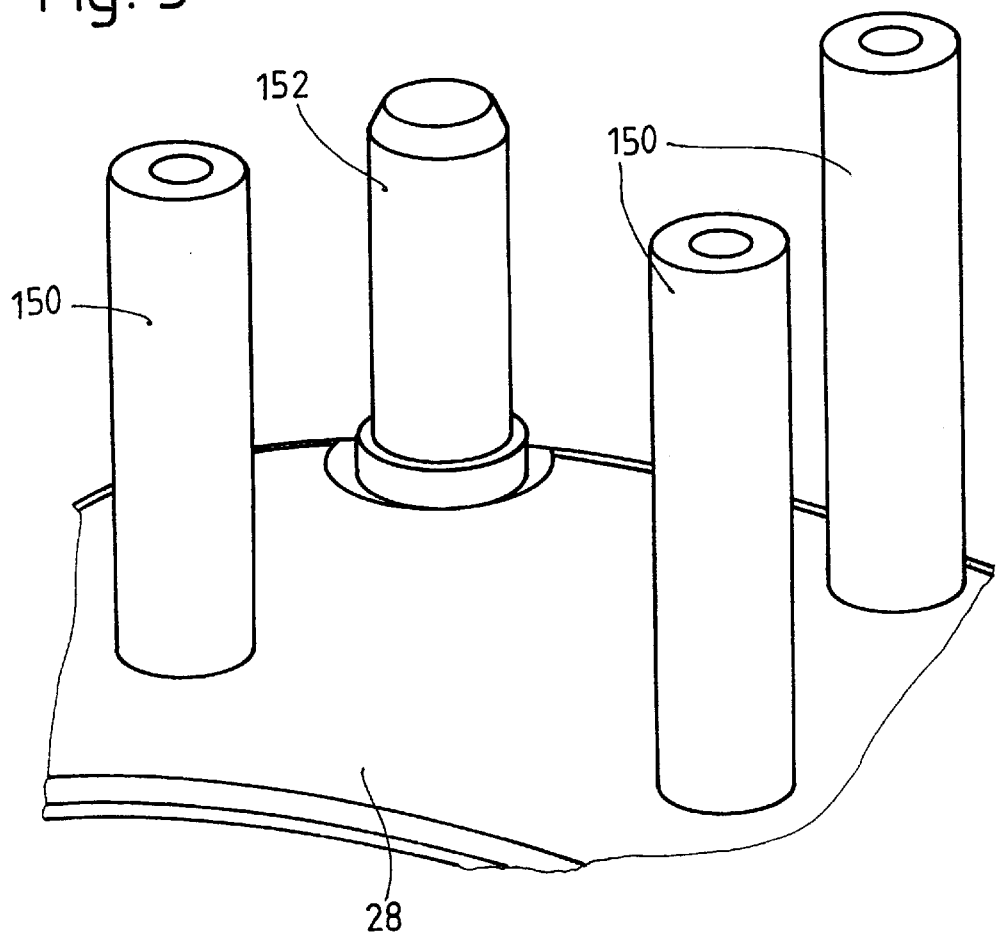
FIG. 5 is a perspective view showing a pneumatic force ring cylinder with a standard interface for connecting or fastening an associated constructional unit thereto, for example, of a measuring and/or valve constructional unit.

A possible embodiment form of the above-mentioned standard interface of the release cylinder 28 is shown in FIG. 5. Each of the three fastening pins 150 welded to the release cylinder 18 has an internal thread, so that a constructional unit (for example, constructional unit 13, 13', 13" or 13''') attached to the pin can be fixed by screws or the like. In addition to the fastening pins 150, an air inlet and outlet nipple 152 is provided which engages in a nipple receptacle 154 of the constructional unit which is mounted by means of the standard interface, wherein a sealing arrangement 156 acts between the nipple 152 and the nipple receptacle 154 as shown in FIG. 6. In this way, a pressure medium flow connection, especially a compressed air flow connection, is produced between a cylinder space of the actuation cylinder 28 and the control/regulating valve arrangement of the constructional unit mounted at the release cylinder 28 or a valve constructional unit which is separate from the constructional unit and which is preferably arranged outside the housing cover.

FIG. 7 shows an actuation unit 13 which can be mounted on a release cylinder and in which a control/regulating valve arrangement and a measuring arrangement 16 are integrated. A thermal separating layer 162 (see also FIG. 1) is provided between a housing portion 12a having the measuring arrangement 16 and standard interface 160 and a housing portion 12b containing the control/regulating valve arrangement, which separating layer 162 serves to thermally isolate the housing portion 12b, especially the control/regulating valve arrangement, from the release cylinder which heats up during operation. The standard interface of the actuation unit is constructed so as to complement an associated standard interface of the release cylinder, for example, the standard interface of FIG. 5. In this case, the standard interface 160 has sleeves 164 which receive the fastening pins or the air inlet nipple and outlet nipple.

In order to keep a heat-sensitive portion of a constructional unit mounted at the release cylinder 28 at a lower temperature than the interior of the housing cover 171 in a reliable manner, the constructional unit can project out of a housing opening or cover opening 170 toward the outside of the housing or cover. The housing opening can be provided in a housing wall portion 172 formed as a pocket or recess, so that a large part of the constructional unit 13 projects out of the cover interior. The housing portion 12b which projects out is then thermally insulated in a particularly effective manner from the housing interior or the release cylinder 28 when the above-mentioned thermal insulating layer 162 is provided in addition. This thermal insulating layer 162 can be provided, for example, in the radial region of the opening 170. Reference is had to FIG. 8 in this regard.

Figure 9:
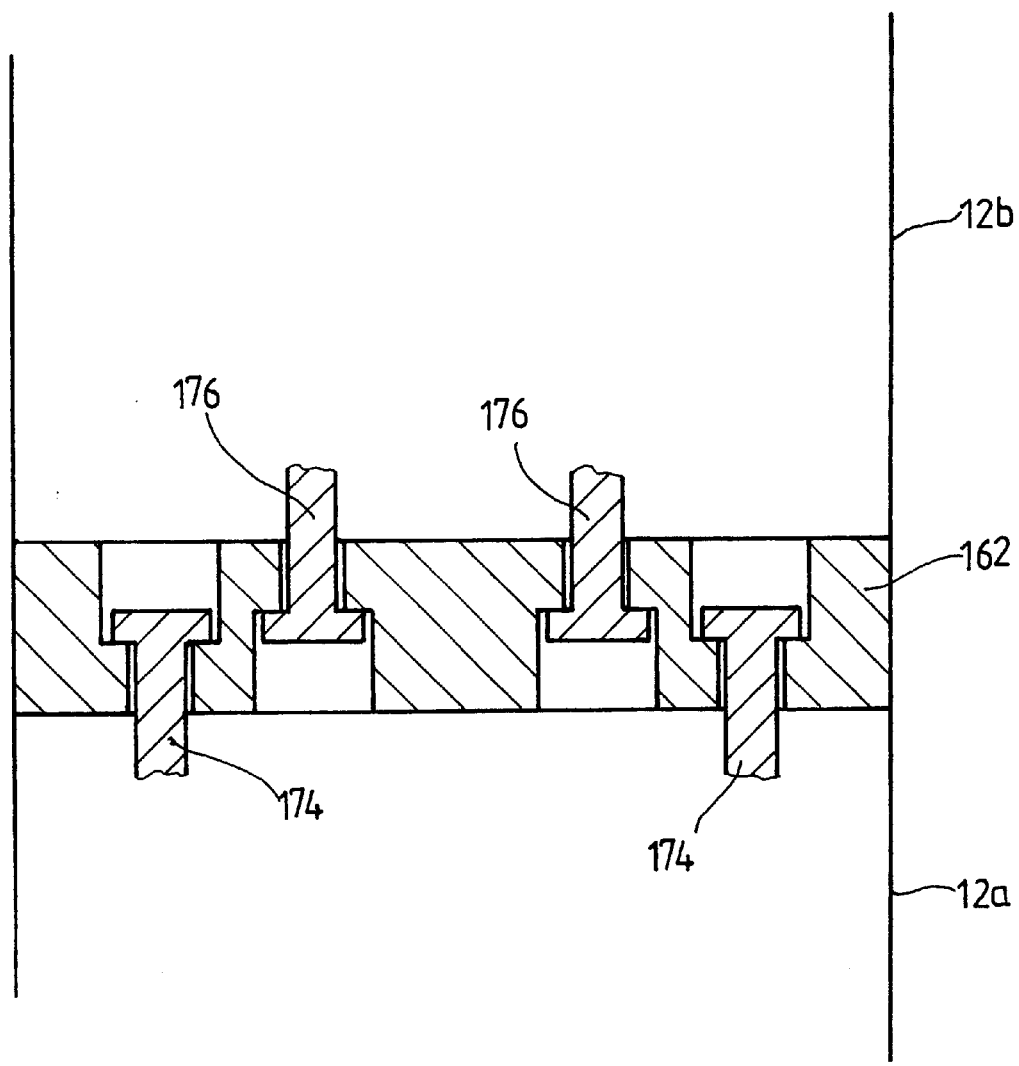
FIG. 9 is a sectional view showing, by way of example, how a thermal separating layer can be arranged, for example, in a measuring and/or valve constructional unit.

For example, the thermal insulating layer 162 can be made of ceramic or from another material with poor thermal conductivity. The thermal separating layer 162 is preferably arranged and fastened between the housing portions 12a and 12b in such a way that there are no substantial heat-conducting bridges overcoming the separating layer 162. Accordingly, for example, the fastening pins or the like which are guided through the separating layer 162 can be dispensed with in the manner shown in FIG. 9. According to FIG. 9, the fastening pins or screws 174 assigned to the housing portion 12a and the fastening pins or screws 176 assigned to housing portion 12b end inside the separating layer 162, so that the heat conduction from housing portion 12a to housing portion 12b is substantially reduced via the fastening means 174, 176.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuation device for a friction clutch arranged in a housing cover in a motor vehicle drivetrain between a drive and a transmission, said actuation device comprising:
    a pressure medium force cylinder arrangement in a housing cover, said pressure medium force cylinder including a ring cylinder, and a release member for actuating said friction clutch;
    a measuring arrangement for detecting an actual release movement of said release member;
    a pressure medium source;
    a control/regulating valve arrangement connected to said pressure medium source, one of a pressure compensation opening and a pressure compensation reservoir, and with said pressure medium force cylinder arrangement, said control/regulating valve arrangement being operated for actuating said pressure medium force cylinder arrangement depending on an actual release movement and on a reference release which can be predetermined;
    a constructional unit arranged at said ring cylinder, said ring cylinder having a space;
    connection means for connecting said ring cylinder space with said control/regulating valve arrangement; and
    said constructional unit including a heat-sensitive region, a fastening region by which said constructional unit is fastened at said ring cylinder, and a thermal separating layer arranged between said heat-sensitive region and said fastening region, said thermal separating layer being a separate element from said heat-sensitive region and said fastening region.

2. An actuation device according to claim 1, wherein the control/regulating valve arrangement is embodied in the heat-sensitive region of the constructional unit.

3. An actuation device according to claim 2, wherein the measuring arrangement is embodied in a part of the constructional unit located between the fastening region and the separating layer.

4. An actuation device according to claim 1 wherein the control/regulating valve arrangement is embodied in the heat-sensitive region of the constructional unit, at least said heat-sensitive region projecting outwardly of an opening in said housing cover.

5. An actuation device according to claim 4, wherein said housing cover includes a wall, said wall including a recessed wall part, said recessed wall part having a surrounding wall portion, said opening being disposed at an inner end portion of said surrounding wall portion.

6. An actuation device according to claim 5, wherein the constructional unit is arranged in said housing cover such that the thermal separating layer is located proximal said opening.

7. An actuation device according to claim 1, wherein the control/regulating valve arrangement is actuated with a control regulating electronics unit depending on the actual release movement producing an electrically presettable command variable and on a characteristic line selected from a group of plural different characteristic lines defining at least one of a desired driving behavior, a driving state, and a vehicle operating state.

8. An actuation device according to claim 1, wherein said fastening region is connected to said thermal separating layer by a first connection and said heat-sensitive layer is connected to said thermal separating layer by a second connection, wherein said first connection is independent of said second connection.

9. An actuation device according to claim 1, wherein said thermal separating layer is made of a ceramic material.

10. An actuation device for a friction clutch arranged in a housing cover in a motor vehicle drivetrain between a drive unit and a transmission, said actuating unit comprising:
    a pressure medium force cylinder arrangement arranged in the housing cover, said pressure medium force cylinder including a ring cylinder, and a release member for actuating said friction clutch;
    a measuring arrangement for detecting an actual release movement of said release member;
    a pressure medium source;
    a control/regulating valve arrangement connected to said pressure medium source, one of a pressure compensation opening and a pressure compensation reservoir, and with said pressure medium force cylinder arrangement, said control/regulating valve arrangement being operated for actuating said pressure force medium cylinder arrangement depending on an actual release movement and on a reference release which can be predetermined;
    a constructional unit arranged at said ring cylinder, said ring cylinder having a space;
    connection means for connecting said ring cylinder space with said control/regulating valve arrangement; and
    said constructional unit including a heat sensitive region, said control/regulating valve arrangement being embodied in said heat-senstive region, said housing cover including a wall, said wall including a recessed wall part, said recessed wall part having an opening and a surrounding wall part, said opening being disposed at an inner end portion of said surrounding wall portion, said heat-sensitive region of said constructional unit projecting outwardly of said housing cover opening such that no portion of the heat-sensitive region is arranged inside of the housing cover opening.

11. An actuation device according to claim 10, wherein the control/regulating valve arrangement is actuated with a control regulating electronics unit depending on the actual release producing an electrically presettable command variable and on a characteristic line selected from a group of plural different characteristic lines defining at least one of a desired driving behavior, a driving state, and a vehicle operating state.

12. An actuation device according to claim 10, wherein a thermal separating layer is arranged between said heat-sensitive region of the constructional unit and said fastening region of said constructional unit, said thermal separating layer being a separate element from said heat-sensitive region and said fastening region.

13. An actuation device according to claim 12, wherein said fastening region is connected to said thermal separating layer by a first connection and said heat-sensitive layer is connected to said thermal separating layer by a second connection, wherein said first connection is independent of said second connection.

14. An actuation device according to claim 12, wherein said thermal separating layer is made of a ceramic material.

15. An actuation device according to claim 10, wherein the control/regulating valve arrangement is actuated with a control regulating electronics unit depending on the actual release producing an electrically presettable command variable and on a characteristic line defining at least one of a desired driving behavior, a driving state, and a vehicle operating state, and wherein a thermal separating layer is arranged between said heat-sensitive region of said constructional unit and said fastening region of said constructional unit, said thermal separating layer being a separate layer being a separate element from said heat-sensitive region and said fastening region.

16. An actuation device according to claim 15, wherein said fastening region is connected to said thermal separating layer by a first connection and said heat-sensitive layer is connected to said thermal separating layer by a second connection, wherein said first connection is independent of said second connection.

17. An actuation device according to claim 15, wherein said thermal separating layer is made of a ceramic material.

* * * * *

UNITED STATES PATENT AND TRADEMARK OFFICE
CERTIFICATE OF CORRECTION

PATENT NO.     : 6,575,283 B2                                                Page 1 of 1
DATED          : June 10, 2003
INVENTOR(S)    : Hans-Jürgen Drexl It is certified that error appears in the above-identified patent and that said Letters Patent is hereby corrected as shown below:

<u>Title page,</u>
Item [75], Inventors, 4<sup>th</sup> inventor should read -- Hans-Jürgen Schmitt, Schonungen (DE) --

Signed and Sealed this

Fourth Day of November, 2003

JAMES E. ROGAN
*Director of the United States Patent and Trademark Office*